(12) United States Patent
Wei et al.

(10) Patent No.: US 10,257,306 B2
(45) Date of Patent: Apr. 9, 2019

(54) SERVICE DATA CACHE PROCESSING METHOD AND SYSTEM AND DEVICE

(71) Applicant: Huawei Technologies Co., Ltd., Shenzhen (CN)

(72) Inventors: Anni Wei, Beijing (CN); Chunshan Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 438 days.

(21) Appl. No.: 14/656,416

(22) Filed: Mar. 12, 2015

(65) Prior Publication Data
US 2015/0189040 A1 Jul. 2, 2015

Related U.S. Application Data

(63) Continuation of application No. PCT/CN2012/081299, filed on Sep. 12, 2012.

(51) Int. Cl.
*G06F 15/173* (2006.01)
*H04L 29/08* (2006.01)

(52) U.S. Cl.
CPC ......... *H04L 67/2852* (2013.01); *H04L 67/26* (2013.01); *H04L 67/2842* (2013.01)

(58) Field of Classification Search
CPC .................... H04L 67/2852; H04L 67/26
USPC ................. 709/219, 217, 224; 711/118
See application file for complete search history.

(56) References Cited

U.S. PATENT DOCUMENTS

| | | | | |
|---|---|---|---|---|
| 6,076,082 A * | 6/2000 | Kindo | ......... | G06N 99/005 706/12 |
| 8,849,793 B2 * | 9/2014 | Vexler | ......... | G06F 17/3048 707/716 |
| 2009/0119455 A1* | 5/2009 | Kisel | ......... | H04L 67/104 711/118 |
| 2009/0144417 A1* | 6/2009 | Kisel | ......... | H04L 41/5003 709/224 |
| 2011/0191449 A1 | 8/2011 | Swildens et al. | | |
| 2011/0258332 A1 | 10/2011 | Fan et al. | | |
| 2012/0092997 A1* | 4/2012 | Mihaly | ......... | H04L 67/104 370/237 |
| 2012/0159558 A1* | 6/2012 | Whyte | ......... | H04N 21/222 725/95 |
| 2013/0268733 A1* | 10/2013 | Narayanan | ......... | G06F 12/0888 711/119 |
| 2014/0013027 A1* | 1/2014 | Jannyavula Venkata | ......... | G06F 12/0866 711/103 |

FOREIGN PATENT DOCUMENTS

| CN | 101404585 A | 4/2009 |
|---|---|---|
| CN | 101448019 A | 6/2009 |
| CN | 101764828 A | 6/2010 |

(Continued)

*Primary Examiner* — David R Lazaro
*Assistant Examiner* — MarieGeorges A Henry
(74) *Attorney, Agent, or Firm* — Slater Matsil, LLP

(57) ABSTRACT

Embodiments of the present invention provide a service data cache processing method and system and a device. The method includes receiving statistical information of service data and sending a service data push request to a service provider SP device according to the statistical information, so that the SP device sends service data to a primary cache deployed in a core network or an edge cache deployed in an access network.

17 Claims, 8 Drawing Sheets

Make statistics on service data to acquire statistical information — S201

Send the statistical information to a cache policy control entity, so that the cache policy control entity requests, according to the statistical information, a service provider SP device to send service data corresponding to a request to a primary cache deployed in a core network and/or an edge cache deployed in an access network — S202

(56) References Cited

FOREIGN PATENT DOCUMENTS

| CN | 101827309 A | 9/2010 |
|---|---|---|
| WO | 2011116819 A1 | 9/2011 |

\* cited by examiner

SERVICE DATA CACHE PROCESSING METHOD AND SYSTEM AND DEVICE

This application is a continuation of International Application No. PCT/CN2012/081299, filed on Sep. 12, 2012, which is hereby incorporated by reference in its entirety.

TECHNICAL FIELD

Embodiments of the present invention relate to communications technologies, and in particular, to a service data cache processing method and system and a device.

BACKGROUND

As a user equipment (UE for short) has continuously increasing functions, a user can access service data or download service data, such as audio and a video, to a UE anytime and anywhere by using a wireless network, which makes it more convenient for the user to listen to the audio and watch the video.

In the prior art, a process of accessing or downloading service data, such as audio and a video, by a UE is as follows. The UE sends a service request message to an access network device, the access network device sends the service request message to a core network device, and the core network device may send the service request message to a service provider (SP for short) by using a packet data network (PDN for short); the SP may send, by using the PDN, service data that is requested to be downloaded by the UE to the core network device, and then the core network device delivers the service data, such as audio and a video, to the UE by using the access network device; so that the UE completes the access or downloading process.

SUMMARY

In a process of implementing embodiments of the present invention, the inventor finds in the prior art that, more network transmission resources are occupied when a large quantity of UEs access or download service data, and therefore a problem of slow access or downloading usually occurs.

Embodiments of the present invention provide a service data cache processing method and system and a device, so as to accelerate a speed at which a UE accesses or downloads service data.

According to one aspect, an embodiment of the present invention provides a service data cache processing method, and the method includes receiving statistical information of service data; and sending a service data push request to a service provider SP device according to the statistical information, so that the SP device sends service data corresponding to the service data push request to a primary cache deployed in a core network or an edge cache deployed in an access network.

An embodiment of the present invention further provides another service data cache processing method, and the method includes making statistics on service data to acquire statistical information; and sending the statistical information to a cache policy control entity, so that the cache policy control entity requests, according to the statistical information, a service provider SP device to send service data corresponding to a request to a primary cache deployed in a core network or an edge cache deployed in an access network.

According to another aspect, an embodiment of the present invention further provides a cache policy control entity, and the entity includes a receiving module, configured to receive statistical information of service data; and a sending module, configured to send a service data push request to a service provider SP device according to the statistical information, so that the SP device sends service data corresponding to the service data push request to a primary cache deployed in a core network or an edge cache deployed in an access network.

An embodiment of the present invention further provides a network device, and the device includes an acquiring module, configured to make statistics on service data to acquire statistical information; and a sending module, configured to send the statistical information to a cache policy control entity, so that the cache policy control entity requests, according to the statistical information, a service provider SP device to send service data corresponding to a request to a primary cache deployed in a core network or an edge cache deployed in an access network.

According to still another aspect, an embodiment of the present invention further provides a service data cache processing system, and the system includes the foregoing provided cache policy control entity and network device.

According to the service data cache processing method and system and the device provided in the embodiments of the present invention, a cache policy control entity sends a service data push request to a service provider SP device according to statistical information, so that the SP device sends service data corresponding to the service data push request to a primary cache deployed in a core network or an edge cache deployed in an access network, so that when accessing or downloading service data, a UE can acquire the service data by accessing the primary cache and the edge cache, which accelerates a speed at which the UE accesses or downloads service data.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
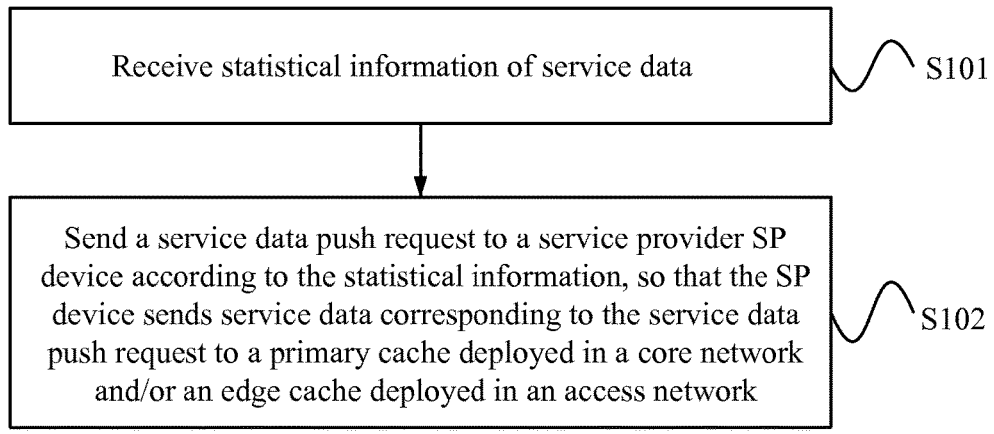
FIG. 1 is a schematic flowchart of a service data cache processing method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (Global System of Mobile Communications, GSM for short) system, a Code Division Multiple Access (Code Division Multiple Access, CDMA for short) system, a Wideband Code Division Multiple Access (Wideband Code Division Multiple Access, WCDMA for short) system, a general packet radio service (General Packet Radio Service, GPRS for short) system, a Long Term Evolution (Long Term Evolution, LTE for short) system, a Long Term Evolution Advanced (Long Term Evolution Advanced, LTE-A for short) system, and a Universal Mobile Telecommunications System (Universal Mobile Telecommunications System, UMTS for short), which is not limited in embodiments of the present invention. However, for ease of description, the embodiments of the present invention are described by using an LTE network as an example.

The embodiments of the present invention may be used in radio networks with different standards. A radio access network may include different network elements in different systems. For example, network elements on the radio access network (Radio Access Network, RAN for short) in the LTE and Long Term Evolution Advanced (Advanced long term evolution, LTE6 for short) include an evolved base station eNB, and network elements on the radio access network in the WCDMA include a radio network controller (Radio Network Controller, RNC for short) and a NodeB. Similarly, other radio networks such as the Worldwide Interoperability for Microwave Access (Worldwide Interoperability for Microwave Access, WiMax for short) may also use solutions similar to those in the embodiments of the present invention, and the only difference is that the related modules in the base station system may be different. No limitation is set by the embodiments of the present invention. However, for ease of description, the following embodiments are described by using an eNodeB as an example.

It should also be understood that in the embodiments of the present invention, the terminal may also be referred to as a user equipment (User Equipment, UE for short), a mobile station (Mobile Station, MS for short), a mobile terminal (Mobile Terminal, MT for short), and the like. The terminal may communicate with one or more core networks by using a radio access network. For example, the terminal may be a mobile phone (or referred to as a "cellular" phone), or a computer having a communication function; for example, the terminal may also be a portable, pocket-sized, handheld, computer built-in, or in-vehicle mobile apparatus.

FIG. 1 is a schematic flowchart of a service data cache processing method according to an embodiment of the present invention, an execution body of this embodiment of the present invention is a cache policy control entity. As shown in FIG. 1, the method specifically includes the following steps.

Step S101: Receive statistical information of service data; and

Step S102: Send a service data push request to a service provider SP device according to the statistical information, so that the SP device sends service data corresponding to the service data push request to a primary cache deployed in a core network or an edge cache deployed in an access network.

In step S101, the cache policy control entity may receive the statistical information of service data periodically or according to a preset time, and the statistical information of service data may be ranking of hits, an attention degree, evaluation scores, and the like of a resource such as a hot video, hot audio, or hot news, and no special limitation is set thereto.

In step S102, the cache policy control entity sends the service data push request to the SP device, and the SP device may directly send the service data corresponding to the service data push request to the primary cache deployed in the core network. The SP device may also send the service data corresponding to the service data push request to the edge cache deployed in the access network. This step has two implementation manners. Firstly, the service data is directly sent to the edge cache deployed in the access network. Secondly, the SP device first sends the service data to the primary cache deployed in the core network, and then the cache policy control entity sends the service data push request to the primary cache, so that the primary cache sends the service data to the edge cache in the access network.

A manner in which the foregoing cache policy control entity sends the service data push request may be a pull (pull) or push (push) manner. When the pull manner is used, the primary cache and the edge cache actively acquire the service data from the SP device; and when the push manner is used, the SP device actively sends the service data to the primary cache and the edge cache.

According to the service data cache processing method provided in this embodiment of the present invention, a cache policy control entity sends a service data push request to an SP device according to statistical information, so that the SP device sends service data corresponding to the service data push request to a primary cache deployed a core network or an edge cache deployed in an access network, and the primary cache and the edge cache may be managed and maintained so that when accessing or downloading service data, a UE can directly acquire the service data by accessing the primary cache deployed in the core network and the edge cache deployed in the access network instead of acquiring the service data from the SP, which accelerates a speed at which the UE accesses or downloads the service data.

Optionally, in this embodiment, the foregoing sending a service data push request to an SP device according to the statistical information includes: determining a data cache policy according to the statistical information, and sending the service data push request to the SP device according to the cache policy.

Specifically, the data cache policy under which service data in the statistical information is stored in the primary cache or the edge cache is determined according to the statistical information, such as access traffic information and an attention degree, that is of the service data and in the statistical information. A specific data cache policy may be one or more preset data cache policies. For example, service data that is in the statistical information and whose access traffic within a preset time is greater than a preset value is stored in the primary cache or the edge cache; or service data that is in the statistical information and whose attention degree is greater than a preset value within a preset time is stored in the primary cache or the edge cache; or service data that is in the statistical information, whose access traffic is greater than a preset value, and whose storage space of a total of the service data reaches a storage upper limit of the primary cache or the edge cache is stored in the primary cache or the primary cache; or top 100 pieces of service data that is in the statistical information and whose access traffic is greater than a preset value is stored in the primary cache or the edge cache. For example, within a preset time, when access traffic of service data in the statistical information first reaches the preset value, the cache policy control entity determines to store the service data whose access traffic reaches the preset value in the primary cache or the edge cache that is managed by the cache policy control entity, and then the cache policy control entity sends a service data download request to the SP device during a network idle time and store the service data in the primary cache. The data cache policy may be determined in multiple manners, and no special limitation is set thereto.

According to the service data cache processing method provided in this embodiment of the present invention, the data cache policy is determined and the service data push request is sent to the SP device, so that the SP device determines the amount of service data that is pushed to the primary cache and the edge cache.

Optionally, in this embodiment, the receiving the statistical information of service data may include: receiving statistical information that is obtained by statistics by the SP device according to a service data request sent by a user equipment; or receiving statistical information that is acquired by statistics by the primary cache according to a service data request sent by a user equipment; or receiving statistical information that is acquired by statistics by the edge cache according to a service data request sent by a user equipment; or receiving statistical information that is acquired by statistics by the SP device according to a service data request collected from various service platforms.

In a specific implementation process, information on which statistics need to be made in this embodiment is mainly a video resource, an audio resource, and the like that have been published on a network, and the SP device, the primary cache, and the edge cache all can make statistics on the resource according to the service data request sent by the user equipment. For example, statistics may be made on ranking of hits according to hits of a hot resource. The SP device may also collect the service data request from the various service platforms, for example, the SP device may perform an overall evaluation on the hot resource according to an attention degree, a love degree, a score evaluation, and the like of the hot resource in the various service platforms, so as to make statistics on the hot resource. The various service platforms may be a portal site, a video download site, various forums, or the like, and no special limitation is set thereto.

In this embodiment, by receiving the statistical information acquired by the SP device, the primary cache, and the edge cache, the cache policy control entity may formulate the cache policy.

The foregoing sending a service data push request to an SP device according to the hot statistical information includes: determining a first data cache policy corresponding to the primary cache and a second data cache policy corresponding to the edge cache; sending a first service data download request to the SP device according to the first data cache policy, so that the SP device sends service data to the primary cache according to the first service data download request; and sending a second service data download request to the SP device according to the second data cache policy, so that the SP device sends service data to the edge cache according to the second service data download request.

After statistics is made on hot information, the cache policy control entity may determine, by using the statistical information, the first data cache policy corresponding to the primary cache and the second data cache policy corresponding to the edge cache.

In a specific implementation process, the first data cache policy determines service data that is sent to the primary cache by the SP device, for example, the cache policy control entity may determine, according to the first data cache policy, to cache resources whose attention degrees rank top 100 within a preset time in the primary cache, and during a network idle time, the cache policy control entity may send the first service data download request to the SP device to request to cache the 100 resources in the primary cache. Accordingly, the second data cache policy determines service data that is sent to the edge cache by the SP device. The cache policy control entity determines, according to the second data cache policy, to directly cache resources whose attention degrees, love degrees, or the like rank top 100 in the edge cache, and during the network idle time, the cache policy control entity may send the second service data download request to the SP device to request to cache the 100 resources in the edge cache.

According to the technical solutions provided in this embodiment of the present invention, a hot resource may be stored in the primary cache deployed in the core network and the edge cache deployed in the access network and the hot resource may be pre-allocated, and when a user accesses or downloads the hot resource, network congestion does not occur.

After the foregoing sending a first service data download request to the SP device according to the first data cache policy, so that the SP device sends service data to the primary cache according to the first service data download request, the service data cache processing method further includes determining, according to the statistical information, a third data cache policy corresponding to the edge cache; and sending a third service data download request to the primary cache according to the third data cache policy, so that the primary cache sends service data to the edge cache according to the third service data download request.

Specifically, the cache policy control entity determines, according to the third data cache policy, to store resources whose attention degrees, love degrees, or the like rank top 100 within a preset time in the edge cache, and during a network idle time, the cache policy control entity sends the second service data download request to the primary cache to request to store the 100 resources in the primary cache.

According to the technical solutions provided in this embodiment of the present invention, a hot resource may be stored in the edge cache deployed in the access network and the hot resource may be pre-allocated, and when a user accesses or downloads the hot resource, network congestion does not occur.

Optionally, the statistical information of service data includes any one or a combination of the following: statistical information of service data whose access traffic is greater than a preset value; statistical information of service data whose attention degree is greater than a preset value; and statistical information of service data that includes a preset keyword.

In this embodiment, a form of the statistical information of service data is diversified, and a data cache policy that meets an actual requirement may be determined according to diversification of the statistical information.

Optionally, the foregoing service data cache processing method further includes: receiving an update message that is of the statistical information and sent by the SP device; and sending a data update request message to the SP device according to the update message, so that the SP device sends, according to the data update request message, service data corresponding to the update request to the primary cache or the edge cache.

Specifically, the cache policy control entity may not only periodically receive the update request that is of the statistical information and sent by the SP device, but also actively initiate the update request to the SP device according to update duration of a hot resource in the statistical information. The cache policy control entity may request the SP device to update a resource cached in the primary cache during a network idle time. The cache policy control entity requests the SP device to update a resource cached in the primary cache during the network idle time, and the cache policy control entity requests the primary cache to update an overdue resource cached in the edge cache during the network idle time.

According to the technical solutions provided in this embodiment of the present invention, a resource in the primary cache and the edge cache is updated by using the cache policy control entity, so that a UE can quickly access a latest hot resource.

Figure 2:
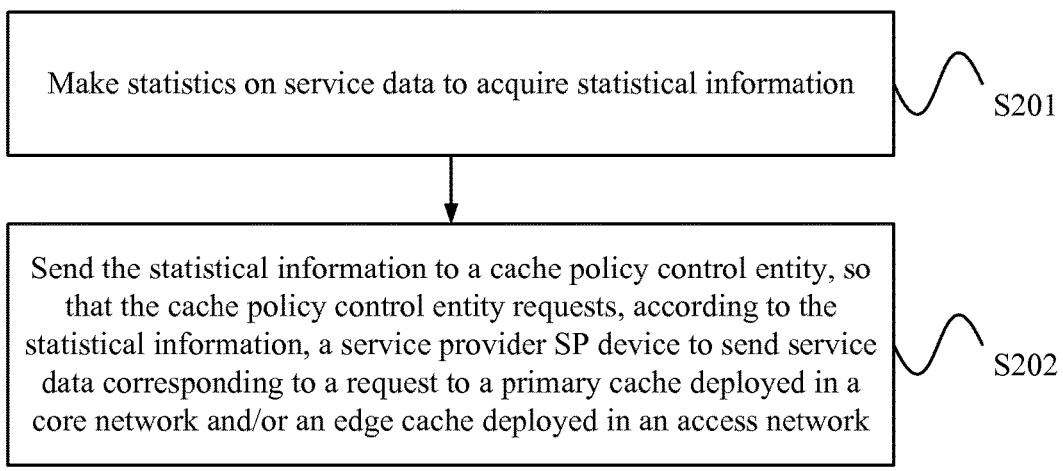
FIG. 2 is a schematic flowchart of a service data cache processing method according to another embodiment of the present invention.

FIG. 2 is a schematic flowchart of a service data cache processing method according to a second embodiment of the present invention, an execution body of this embodiment is an SP device, a primary cache, and an edge cache. As shown in FIG. 2, the method specifically includes the following steps.

Step S201: Make statistics on service data to acquire statistical information; and Step S202: Send the statistical information to a cache policy control entity, so that the cache policy control entity requests, according to the statistical information, a service provider SP device to send service data corresponding to a request to a primary cache deployed in a core network or an edge cache deployed in an access network.

In a specific implementation process, in step S201, the SP device, the primary cache, and the edge cache may make statistics on the service data to acquire the statistical information, and the statistical information may be ranking of hits, an attention degree, evaluation scores, and the like of a resource such as a hot video, hot audio, or hot news, and no special limitation is set thereto.

In step S202, the SP device, the primary cache, and the edge cache may feedback a result of the statistical information to the cache policy control entity, so that the cache policy control entity requests, according to the statistical information, the service provider SP device to send the service data corresponding to the request to the primary cache in the core network or the edge cache in the access network. For a process of sending service data to the primary cache and the edge cache by the SP device, reference is specifically made to descriptions in the foregoing embodiment, and details are not described herein again.

According to the service data cache processing method provided in this embodiment of the present invention, an SP device, a primary cache, and an edge cache may feedback a result of statistical information to a cache policy control entity, so that the cache policy control entity can request, according to the statistical information, the SP device to send service data corresponding to a request to the primary cache deployed in a core network or the edge cache deployed in an access network, so that when accessing or downloading service data, a UE can directly acquire the service data by accessing the primary cache deployed in the core network and the edge cache deployed in the access network instead of acquiring the service data from the SP, which accelerates a speed at which the UE accesses or downloads service data.

Optionally, the making statistics on service data to acquire statistical information includes: performing statistical processing on a service data request sent by a user equipment to acquire the statistical information.

In this embodiment, statistical processing is performed on the service data request sent by the user equipment, and the service data is mainly a video resource, an audio resource, and the like that have been published on a network. The SP device, the primary cache, and the edge cache may make statistics on a specific service request of the user equipment, for example statistics may be made on ranking of hits according to hits of a hot resource by the user equipment.

Optionally, the making statistics on service data to acquire statistical information includes performing statistical processing on a service data request collected by various service platforms to acquire the statistical information.

The SP device may collect the service data request from the various service platforms, for example, the SP device may perform an overall evaluation on a hot resource according to an attention degree, a love degree, a score evaluation, and the like of the hot resource in the various service platforms, so as to make statistics on the hot resource. The various service platforms may be a portal site, a video download site, various forums, or the like, and no special limitation is set thereto.

Based on the foregoing, statistical processing may be performed on the service data request sent by the user equipment or statistical processing may be performed on the service data request collect by the various service platforms to acquire the statistical information, and the statistical range is large and statistical data is reliable.

Optionally, the statistical information of service data includes any one or a combination of the following: statistical information of service data whose access traffic is greater than a preset value; statistical information of service data whose attention degree is greater than a preset value; and statistical information of service data that includes a preset keyword.

In this embodiment, a form of the statistical information of service data is diversified, and a data cache policy that meets an actual requirement may be determined according to diversification of the statistical information.

Optionally, the foregoing service data cache processing method further includes: sending an update message of the statistical information to the cache policy control entity; receiving a data update request message that is sent by the cache policy control entity according to the update message; and sending, according to the data update request message, service data corresponding to the update request to the primary cache or the edge cache.

In a specific implementation process, the SP device may periodically send the update message of the statistical information to the cache policy control entity, and when the cache policy control entity sends the data update request message to the SP device, the SP device sends service data corresponding to updated statistical information to the primary cache or the edge cache. For a process of sending service data to the primary cache or the edge cache by the SP device, reference is specifically made to descriptions in the foregoing embodiment, and details are not described herein again.

According to the technical solutions provided in this embodiment of the present invention, the cache policy control entity updates a resource in the primary cache and the edge cache, so that a UE can quickly access a latest hot resource.

Figure 3:
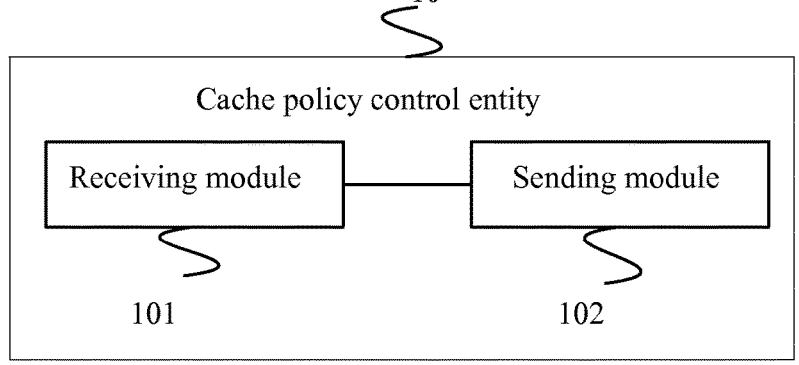
FIG. 3 is a schematic structural diagram of a cache policy control entity according to an embodiment of the present invention.

FIG. 3 is a schematic structural diagram of a cache policy control entity according to an embodiment of the present invention. As shown in FIG. 3, a cache policy control entity 10 provided in this embodiment of the present invention includes a receiving module 101 and a sending module 102, where the receiving module 101 is configured to receive statistical information of service data; and the sending module 102 is configured to send a service data push request to a service provider SP device according to the statistical information, so that the SP device sends service data corresponding to the service data push request to a primary cache deployed in a core network or an edge cache deployed in an access network.

The cache policy control entity provided in this embodiment of the present invention may send, according to statistical information, service data corresponding to the statistical information to a primary cache deployed in a core network or an edge cache deployed in an access network, and it may be implemented that the cache policy control entity maintains and manages the primary cache and the edge cache, so that when accessing or downloading service data, a UE can directly acquire the service data by accessing the primary cache deployed in the core network and the edge cache deployed in the access network instead of acquiring the service data from the SP, which accelerates a speed at which the UE accesses or downloads service data.

Figure 4:
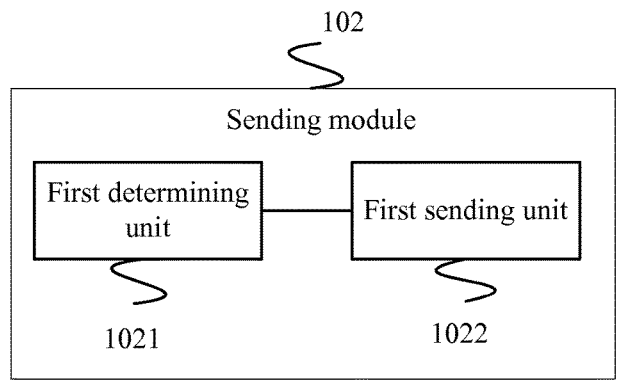
FIG. 4 is a schematic structural diagram of a cache policy control entity according to another embodiment of the present invention.

FIG. 4 is a schematic structural diagram of a cache policy control entity according to another embodiment of the present invention. As shown in FIG. 4, a sending module 102 provided in this embodiment of the present invention includes a first determining unit 1021 and a first sending unit 1022, where the first determining unit 1021 is configured to determine a data cache policy according to statistical information; and the first sending unit 1022 is configured to send a service data push request to an SP device according to the data cache policy.

According to the cache policy control entity provided in this embodiment of the present invention, the first determining unit 1021 determines the data cache policy and the first sending unit 1022 sends a service data download request, so that the SP device determines the amount of service data that is pushed to the primary cache and the edge cache.

Optionally, a receiving module 101 provided in this embodiment of the present invention is specifically configured to receive statistical information that is obtained by statistics by the SP device according to a service data request sent by a user equipment; or receive statistical information that is acquired by statistics by the primary cache according to a service data request sent by a user equipment; or receive statistical information that is acquired by statistics by the edge cache according to a service data request sent by a user equipment; or receive statistical information that is acquired by statistics by the SP device according to a service data request collected from various service platforms.

In this embodiment, the receiving module 101 receives the statistical information acquired by the SP device, the primary cache, and the edge cache, so that the cache policy control entity can formulate the cache policy.

Figure 5:
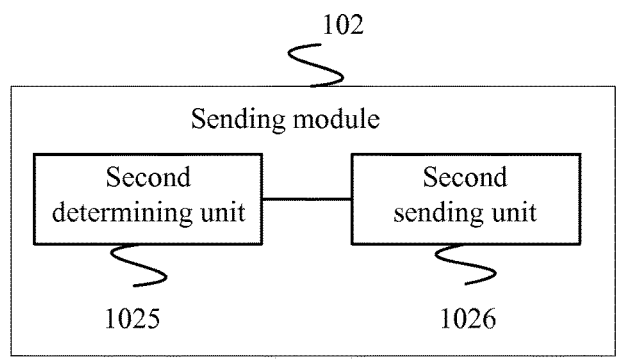
FIG. 5 is a schematic structural diagram of a cache policy control entity according to still another embodiment of the present invention.

FIG. 5 is a schematic structural diagram of a cache policy control entity according to still another embodiment of the present invention. As shown in FIG. 5, a sending module 102 includes a second determining unit 1025 and a second sending unit 1026.

The second determining unit 1025 is configured to determine a first data cache policy corresponding to a primary cache and a second data cache policy corresponding to an edge cache.

The second sending unit 1026 is configured to send a first service data download request to an SP device according to the first data cache policy, so that the SP device sends service data to the primary cache according to the first service data download request; and send a second service data download request to the SP device according to the second data cache policy, so that the SP device sends service data to the edge cache according to the second service data download request.

The foregoing second determining unit 1025 is further configured to determine, according to statistical information, a third data cache policy corresponding to the edge cache.

The second sending unit 1026 is further configured to send a third service data download request to the primary cache according to the third data cache policy, so that the primary cache sends service data to the edge cache according to the third service data download request.

According to the technical solutions provided in this embodiment of the present invention, a hot resource may be stored in a primary cache deployed in a core network and an edge cache deployed in an access network and the hot resource may be pre-allocated, and when a user accesses or downloads the hot resource, network congestion does not occur.

Optionally, the statistical information of service data includes any one or a combination of the following: statistical information of service data whose access traffic is greater than a preset value; statistical information of service data whose attention degree is greater than a preset value; and statistical information of service data that includes a preset keyword.

In this embodiment, a form of the statistical information of service data is diversified, and a data cache policy that meets an actual requirement may be determined according to diversification of the statistical information.

Figure 6:
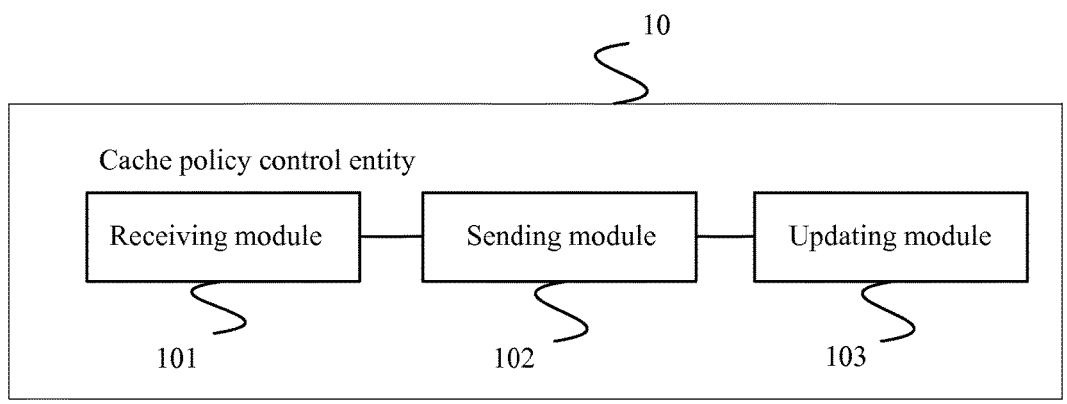
FIG. 6 is a schematic structural diagram of a cache policy control entity according to yet another embodiment of the present invention.

FIG. 6 is a cache policy control entity according to yet another embodiment of the present invention. As shown in FIG. 6, a cache policy control entity 10 provided in this embodiment of the present invention includes the entity described in any one of the foregoing embodiments, and in addition to a receiving module 101 and a sending module 102, the cache policy control entity 10 further includes an updating module 103. The updating module 103 is specifically configured to receive an update message that is of statistical information and sent by an SP device; and send a data update request message to the SP device according to the update message, so that the SP device sends, according to the data update request message, service data corresponding to the update request to a primary cache or an edge cache.

According to the technical solutions provided in this embodiment of the present invention, the updating module updates a resource in the primary cache and the edge cache, so that a UE can access a latest hot resource.

It may be clearly understood by a person skilled in the art that, for ease and brevity of description, for a detailed working process of the foregoing cache policy control entity, reference may be made to a corresponding process in the foregoing method embodiments, and details are not described herein again.

Figure 7:
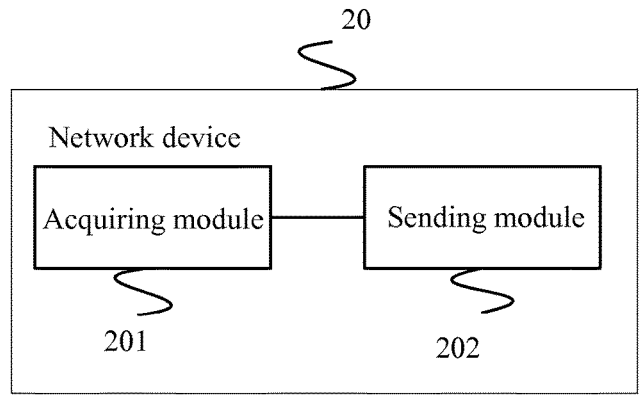
FIG. 7 is a schematic structural diagram of a network device according to an embodiment of the present invention.

FIG. 7 is a schematic structural diagram of a network device according to an embodiment of the present invention. As shown in FIG. 7, a network device 20 provided in this embodiment of the present invention includes an acquiring module 201 and a sending module 202, where the acquiring module 201 is configured to make statistics on service data to acquire statistical information; and the sending module 202 is configured to send the statistical information to a cache policy control entity, so that the cache policy control entity requests, according to the statistical information, a service provider SP device to send service data corresponding to a request a primary cache deployed in a core network or an edge cache deployed in an access network.

According to the network device provided in this embodiment of the present invention, a sending module may feedback hot statistical information to a cache policy control entity, so that the cache policy control entity can request, according to the hot statistics information, a service provider SP device to send service data corresponding to a request to a primary cache deployed in a core network or an edge cache deployed in an access network, so that when accessing or downloading service data, a UE can directly acquire the service data by accessing the primary cache deployed in the core network and the edge cache deployed in the access network instead of acquiring the service data from the SP, which accelerates a speed at which the UE accesses or downloads service data.

Optionally, the acquiring module 201 is specifically configured to perform statistical processing on a service data request sent by a user equipment to acquire the statistical information.

Optionally, the network device is the SP device, the primary cache, or the edge cache.

Optionally, the acquiring module 201 is specifically configured to perform statistical processing on a service data request collected by various service platforms to acquire the statistical information.

Based on the foregoing, statistical processing may be performed on the service data request sent by the user equipment or statistical processing may be performed on the service data request collect by the various service platforms to acquire the statistical information, and the statistical range is large and statistical data is reliable.

Optionally, the statistical information of service data includes any one or a combination of the following: statistical information of service data whose access traffic is greater than a preset value; statistical information of service data whose attention degree is greater than a preset value; and statistical information of service data that includes a preset keyword.

In this embodiment, a form of the statistical information of service data is diversified, and a data cache policy that meets an actual requirement may be determined according to diversification of the statistical information.

Figure 8:
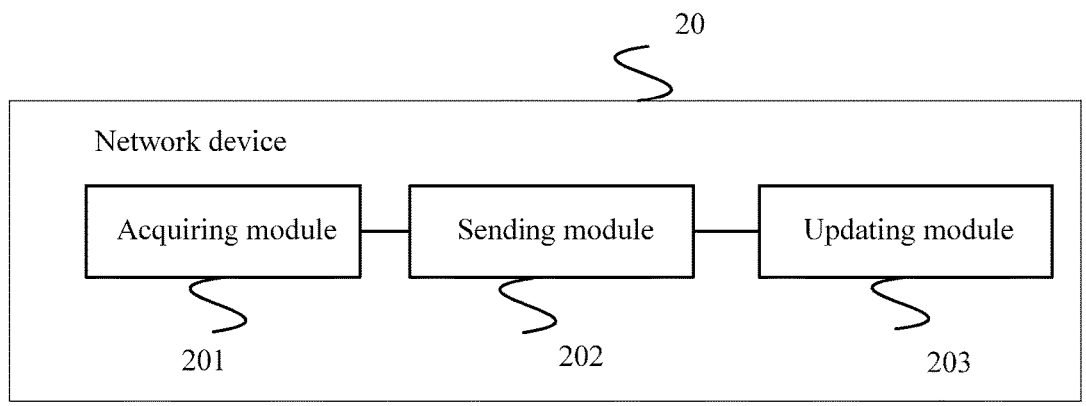
FIG. 8 is a schematic structural diagram of a network device according to another embodiment of the present invention.

FIG. 8 is a schematic structural diagram of a network device according to another embodiment of the present invention. As shown in FIG. 8, in addition to an acquiring module 201 and a sending module 202, a network device 20 provided in this embodiment of the present invention further includes an updating module 203. The updating module 203 is configured to send an update message of statistical information to a cache policy control entity, receive a data update request message that is sent by the cache policy control entity according to the update message; and send, according to the data update request message, service data corresponding to the update request to a primary cache or an edge cache.

According to the technical solutions provided in this embodiment of the present invention, the cache policy control entity updates a resource in the primary cache and the edge cache, so that a UE can quickly access a latest hot resource.

It may be clearly understood by a person skilled in the art that, for ease and brevity of description, for a detailed working process of the foregoing network device, reference may be made to a corresponding process in the foregoing method embodiments, and details are not described herein again.

Figure 9:
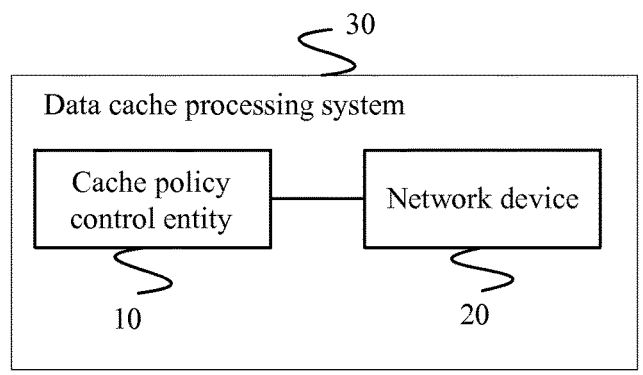
FIG. 9 is a schematic diagram of a service data cache processing system according to an embodiment of the present invention.

FIG. 9 is a schematic diagram of a service data cache processing system according to an embodiment of the present invention. As shown in FIG. 9, a service data cache processing system 30 provided in this embodiment of the present invention includes any one of the cache policy entity 10 and the network device 20 described.

According to the data cache processing system provided in this embodiment of the present invention, it may be implemented that a cache policy control entity maintains and manages a primary cache and an edge cache, so that when accessing or downloading service data, a UE can directly acquire the service data by accessing the primary cache deployed in a core network and the edge cache deployed in an access network instead of acquiring the service data from the SP, which accelerates a speed at which the UE accesses or downloads service data.

In a specific embodiment, the cache policy control entity and the primary cache in the network device may be disposed in a same device in a function entity form, and certainly, may be separately disposed in a different device in a function entity form, and it may also be that one of the cache policy control entity and the primary cache in the network device is disposed in a device in a function entity form and the other is a standalone network device.

When the network system is a 2G, 3G, or 4G network, a primary cache device may be disposed in a P-GW or a GGSN, or disposed on an SGi or a Gi interface between the P-GW or GGSN and the SP device. The cache policy control entity may be a network device of a standalone device, and the cache policy control entity may also be configured as a function module in a policy and charging rules function (Policy and Charging Rules Function, PCRF). The edge cache is usually placed on a network user interface data channel that is relatively close to a UE, and may also be disposed in an eNB, an RNC, or a BSC in a function entity form. In a WiFi network, an edge cache device may be disposed in a WiFi access point (Access Point, AP). Certainly, in the foregoing solutions, an interface between various devices or function modules and an interface between the various devices or function modules and other devices or function modules in the network are not described. Considering that these interfaces are specifically related to an actual type of a network, in this embodiment of the present invention, examples cannot be all described, and only one type of network is described in the following; for a person of ordinary skill in the present invention, the interface and an interface relationship are defined only for clear description; in actual implementation, any name that implements a function of the interface or a defined interface falls within the protection scope of the present invention, which is not further described in the following.

Figure 10:
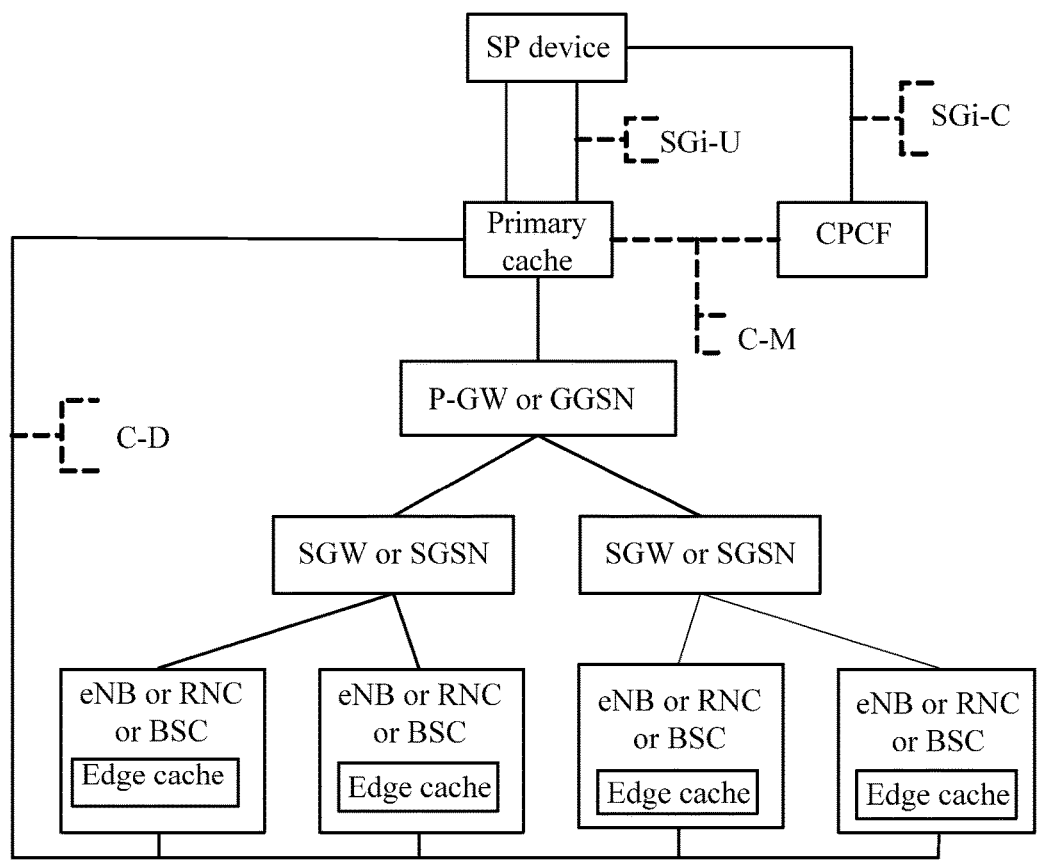
FIG. 10 is a schematic diagram of a device and a related interface in a 3GPP network according to an embodiment of the present invention.

FIG. 10 is a schematic diagram of a device and a related interface in a 3GPP network according to an embodiment of the present invention. A primary cache and a cache policy control entity are standalone network devices. Among devices, an interface represented by a dashed line is an interface that does not transmit content but transmits only control related to the content and metadata of the content; and an interface represented by a solid line is an interface that transmits content (similarly hereinafter). In this embodiment, the following function entities are disposed:

a primary cache on an SGi-U interface, which is configured to directly cache content of an external SP device, and in this embodiment, the primary cache is located on a data channel between the SP device and a P-GW (or GGSN);

an edge cache built in a RAN node, which is connected to the primary cache by using a C-D interface, where multiple edge caches may be disposed and are configured to directly cache the content that is of the external SP device and provided by the primary cache; and the cache policy control entity (CPCF, Cache Policy Control Function), which is connected to the primary cache by using a C-M interface and is connected to the external SP device by using an SGi-C interface, is configured to receive a content cache request from the external SP device and control the primary cache and the edge cache to cache related content.

The related interface includes:

an interface between the primary cache and the external SP device, which is represented by SGi-U, and the SGi-U interface is a logical interface; the interface may be a part of a function of an SGi/Gi interface, and the function of the SGi/Gi interface may be extended based on existing technologies, so that the SGi/Gi interface has a function of the SGi-U; and the SGi-U interface may also be a newly defined interface; the SGi-U interface is a connection interface that implements content caching between the primary cache and the external SP device;

an interface between the CPCF and the external SP device, which is represented by SGi-C, and the SGi-C interface is a logical interface; the interface may be a part of a function of an SGi/Gi interface, and the function of the SGi/Gi interface may be extended based on existing technologies, so that the SGi/Gi interface has a function of the SGi-U; and the SGi-C interface may also be a newly defined interface; the SGi-U interface is a connection interface that implements a function of controlling content caching between the CPCF and the external SP device;

an interface between the primary cache and the CPCF, which is represented by C-M; the CPCF controls the primary cache to acquire content from the external SP device by using the C-M interface, and locally stores the content in the primary cache; and an interface between the primary cache and the edge cache, which is represented by C-D; the edge cache acquires, by using the C-D interface, the content that is acquired by the primary cache from the external SP device, and locally stores the content.

It should be noted that, in FIG. 10, only a structure of a network related to cache is described and an entire structure of the network is not described, and it should be understood that another structure is consistent with that in the prior art and is not described herein again.

For a system architecture of a flowchart described in the following embodiments, reference may be made to FIG. 10. The system architecture is a bi-layer cache architecture and is divided into the primary cache and the edge cache; the system architecture is not described again in the following embodiments. A network device shown in a signaling diagram of a service data cache processing method in the following embodiments may use a network device shown in FIG. 3 to FIG. 9; and a service data cache processing method in a signaling diagram of a service data cache processing method in the following embodiments may use a service data cache processing method in FIG. 1 and FIG. 2.

Figure 11:
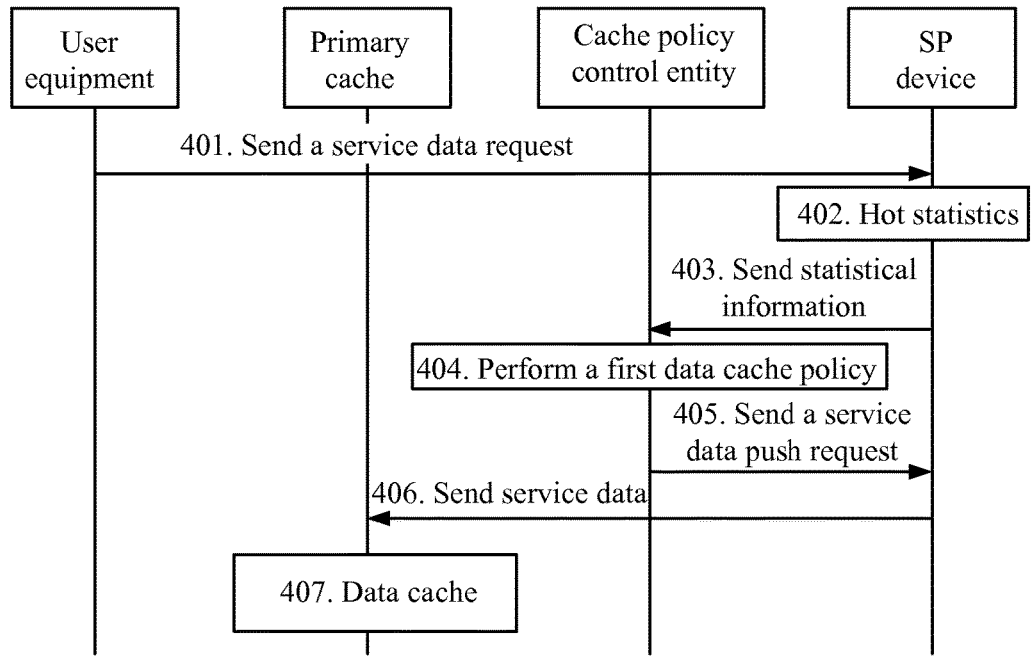
FIG. 11 is a first signaling diagram of a service data cache processing method according to an embodiment of the present invention.

FIG. 11 is a first signaling diagram of a service data cache processing method according to an embodiment of the present invention, and as shown in FIG. 11, the method includes the following steps.

Step 401: A user equipment sends a service data request to an SP device;

Step 402: The SP device makes hot statistics according to the service data request sent by the user equipment, to acquire statistical information, where the statistical information may be ranking of hits, an attention degree, evaluation scores, and the like of a resource such as a hot video, hot audio, or hot news;

Step 403: The SP device sends the statistical information to a cache policy control entity.

Step 404: The cache policy control entity performs a first data cache policy according to the statistical information, and the cache policy control entity may determine, according to the first data cache policy, to store, in a primary cache managed by the cache policy control entity, a hot resource ranking in the top in the statistical information.

Step 405: The cache policy control entity sends a service data push request to the SP device to request to store the resource ranking in the top in the primary cache.

Step 406: After receiving the service data push request from the cache policy control entity, the SP device sends service data to the primary cache, that is, sends the hot resource ranking in the top to the primary cache.

Step 407: The primary cache stores the data.

According to the service data cache processing method provided in this embodiment of the present invention, a user equipment sends a service data request to an SP device, and by using a cache policy control entity, the SP device sends service data ranking in the top to a primary cache.

Figure 12:
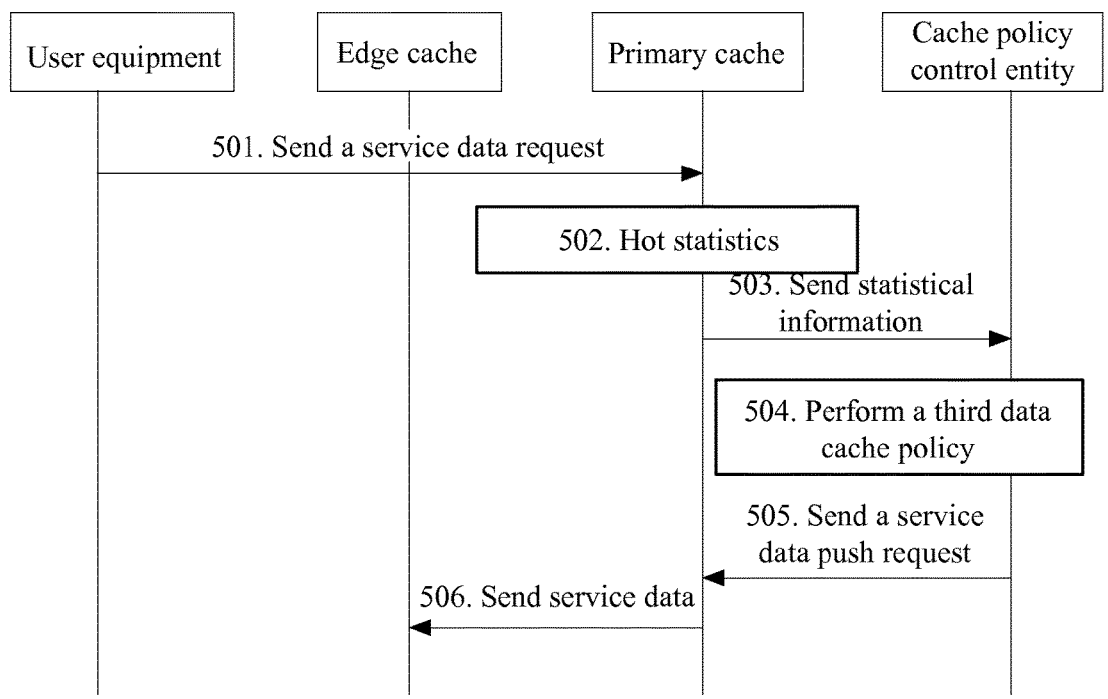
FIG. 12 is a second signaling diagram of a service data cache processing method according to an embodiment of the present invention.

FIG. 12 is a second signaling diagram of a service data cache processing method according to an embodiment of the present invention, and as shown in FIG. 12, the method includes the following steps.

Step 501: A user equipment sends a service data request to a primary cache.

Step 502: The primary cache makes hot statistics according to the service data request sent by the user equipment, to acquire statistical information.

Step 503: The primary cache sends the statistical information to a cache policy control entity.

Step 504: The cache policy control entity performs a third data cache policy according to the statistical information, and the cache policy control entity may determine, according to the data cache policy, to store, in an edge cache managed by the cache policy control entity, a hot resource ranking in the top in the statistical information.

Step 505: The cache policy control entity sends a service data push request to the primary cache to request to store the hot resource ranking in the top in the edge cache.

Step 506: After receiving the service data push request from the cache policy control entity, the primary cache sends service data to the edge cache, that is, sends the hot resource ranking in the top to the edge cache.

According to the service data cache processing method provided in this embodiment of the present invention, a user equipment sends a service data request to a primary cache, and by using a cache policy control entity, the primary cache sends service data ranking in the top to an edge cache. It should be noted that, in step 505, if the cache policy control entity finds that some service data has not been cached in the primary cache, the cache policy control entity caches the service data in the primary cache according to the method shown in FIG. 12.

Figure 13:
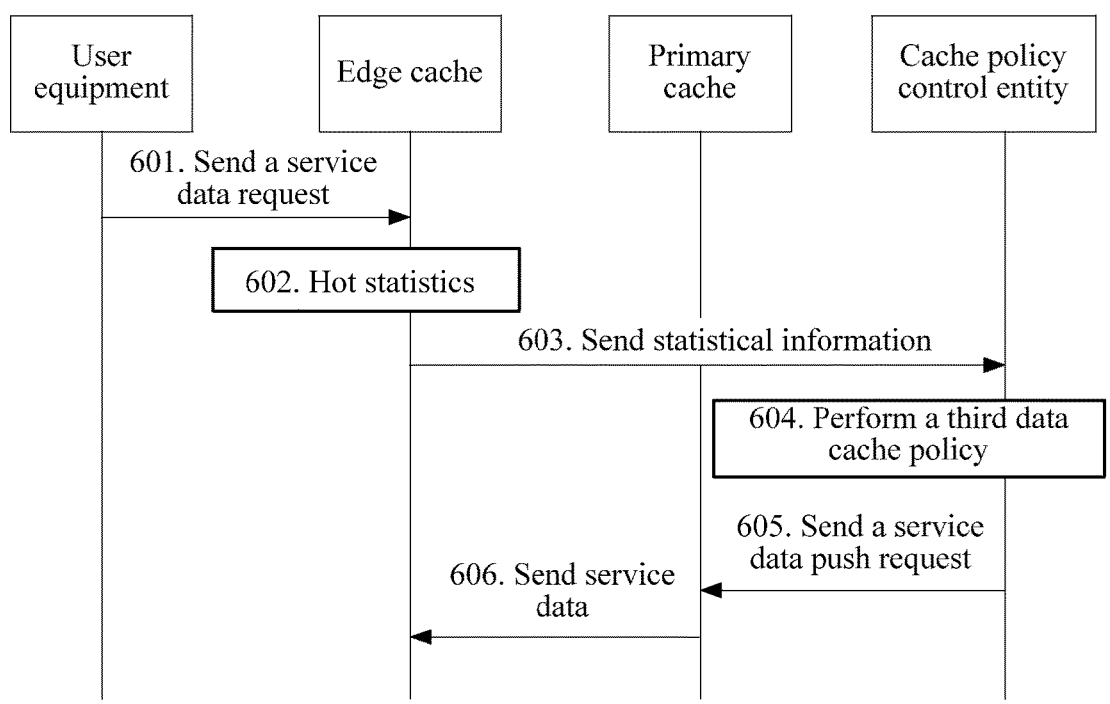
FIG. 13 is a third signaling diagram of a service data cache processing method according to an embodiment of the present invention.

FIG. 13 is a third signaling diagram of a service data cache processing method according to an embodiment of the present invention, and as shown in FIG. 13, the method includes the following steps.

Step 601: A user equipment sends a service data request to an edge cache.

Step 602: The edge cache makes hot statistics according to the service data request sent by the user equipment, to acquire statistical information.

Step 603: The edge cache sends the statistical information to a cache policy control entity.

Step 604: The cache policy control entity performs a third data cache policy according to the statistical information, and the cache policy control entity finds that some hot resources has not been cached in the edge cache, the cache policy control entity may determine, according to the data cache policy, to store, in the edge cache managed by the cache policy control entity, a hot resource ranking in the top in the statistical information.

Step 605: The cache policy control entity sends a service data push request to a primary cache to request to store the hot resource ranking in the top in the edge cache.

Step 606: After receiving the service data push request from the cache policy control entity, the primary cache sends service data to the edge cache, that is, sends the hot resource ranking in the top to the edge cache.

According to the service data cache processing method provided in this embodiment of the present invention, a user equipment sends a service data request to an edge cache, and by using a cache policy control entity, the edge cache may store service data ranking in the top.

According to the service data cache processing method shown in the foregoing FIG. 11 to FIG. 13, a hot resource may be separately stored in a primary cache and an edge cache according to a service data request of a user equipment, so that a user can quickly access and download service data.

Figure 14:
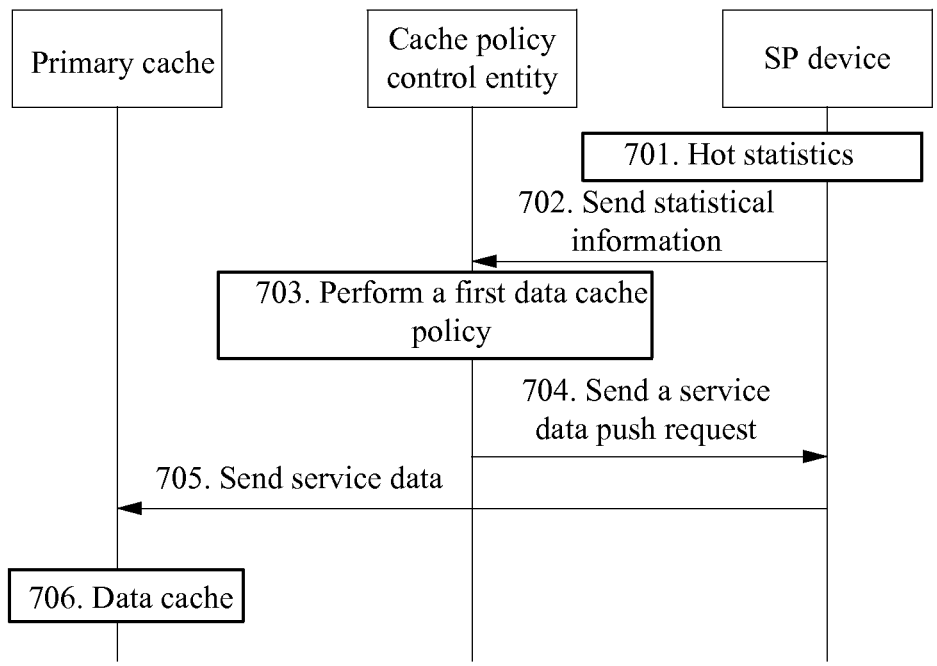
FIG. 14 is a fourth signaling diagram of a service data cache processing method according to an embodiment of the present invention.

FIG. 14 is a fourth signaling diagram of a service data cache processing method according to an embodiment of the present invention, and as shown in FIG. 14, the method includes the following steps.

Step 701: An SP device makes hot statistics on a service data request collected from various service platforms to acquire statistical information.

Step 702: The SP device sends the statistical information to a cache policy control entity.

Step 703: The cache policy control entity performs a data cache policy according to the statistical information, and the cache policy control entity may determine, according to the first data cache policy, to store, in a primary cache managed by the cache policy control entity, a hot resource ranking in the top in the statistical information.

Step 704: The cache policy control entity sends a service data push request to the SP device to request to store the hot resource ranking in the top in the primary cache.

Step 705: After receiving the service data push request from the cache policy control entity, the SP device sends service data to the primary cache, that is, sends the hot resource ranking in the top to the primary cache.

Step 706: The primary cache stores the data.

According to the service data cache processing method provided in this embodiment of the present invention, an SP device makes hot statistics on a service data request collected from various service platforms, to acquire statistical information, and sends the statistical information to a cache policy control entity, so that a primary cache can cache a latest hot resource and a user can quickly access the latest resource.

Figure 15:
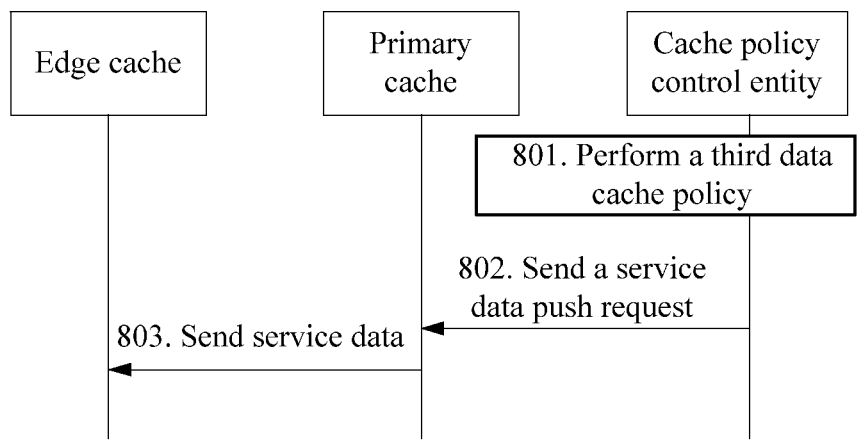
FIG. 15 is a fifth signaling diagram of a service data cache processing method according to an embodiment of the present invention.

FIG. 15 is a fifth signaling diagram of a service data cache processing method according to an embodiment of the present invention, and as shown in FIG. 15, the method includes the following steps.

Step 801: A cache policy control entity performs a third data cache policy according to statistical information, and determines to store a hot resource ranking in the top in an edge cache.

Step 802: The cache policy control entity sends a service data push request to a primary cache to request to store the hot resource ranking in the top in the edge cache.

Step 803: After receiving the service data push request from the cache policy control entity, the primary cache sends service data to the edge cache, that is, sends the hot resource ranking in the top to the edge cache.

The service data cache processing method provided in this embodiment of the present invention, a cache policy control entity may select, according to hot statistical information, a hot resource in a primary cache and pre-allocate and store the hot resource in an edge cache, so that a user can quickly access a latest resource.

Figure 16:
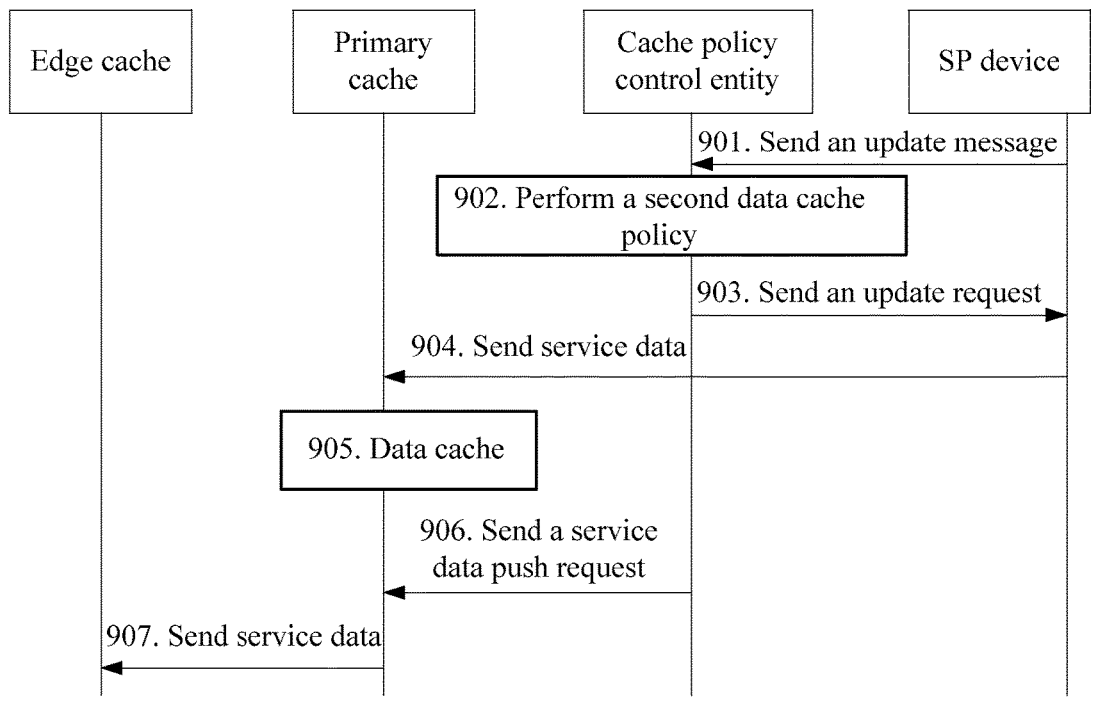
FIG. 16 is a sixth signaling diagram of a service data cache processing method according to an embodiment of the present invention.

FIG. 16 is a sixth signaling diagram of a service data cache processing method according to an embodiment of the present invention, and as shown in FIG. 16, the method includes the following steps.

Step 901: An SP device periodically sends an update request to a cache policy control entity.

Step 902: The cache policy control entity performs a second data cache policy, and determines to update service data in a primary cache.

Step 903: The cache policy control entity sends an update request to the SP device during a network idle time to request to update a resource cached in the primary cache.

Step 904: The SP device sends service data to the primary cache to update the resource cached in the primary cache.

Step 905: The primary cache updates the service data.

Step 906: The cache policy control entity sends a service data push request to the primary cache during the network idle time to request to update an overdue resource in the edge cache.

Step 907: The primary cache sends service data to the edge cache to update the overdue resource in the edge cache.

According to the service data cache processing method provided in this embodiment of the present invention, an SP device periodically sends an update request to a cache policy control entity and the cache policy control entity performs a data cache policy, so that an overdue resource in a primary cache and edge cache can be updated.

Figure 17:
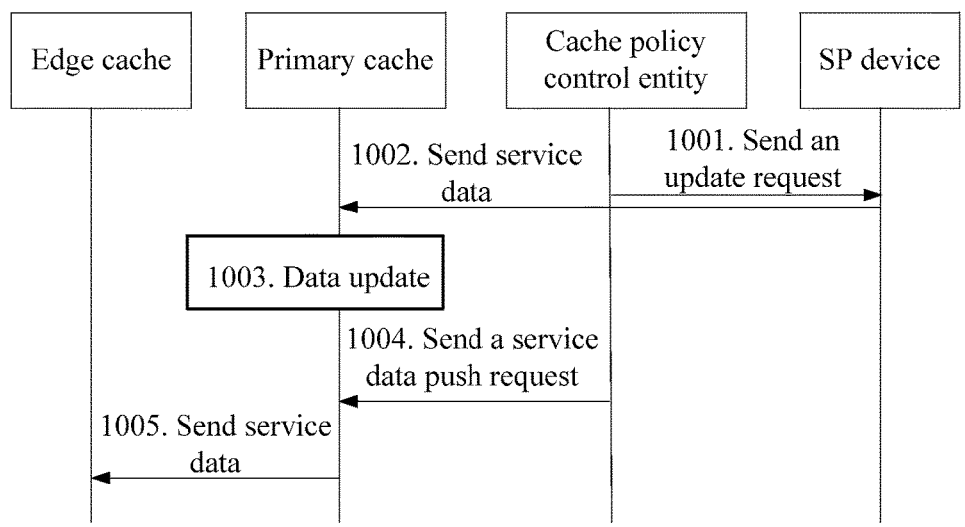
FIG. 17 is a seventh signaling diagram of a service data cache processing method according to an embodiment of the present invention.

FIG. 17 is a seventh signaling diagram of a service data cache processing method according to an embodiment of the present invention, and as shown in FIG. 17, the method includes the following steps.

Step 1001: A cache policy control entity actively sends an update request to an SP device according to update duration of a resource.

Step 1002: The SP device sends service data to a primary cache to update a resource cached in the primary cache.

Step 1003: The primary cache updates the service data.

Step 1004: The cache policy control entity sends a service data push request to the primary cache during a network idle time to request to update an overdue resource in the edge cache.

Step 1005: The primary cache sends service data to the edge cache to update the overdue resource in the edge cache.

According to the service data cache processing method provided in this embodiment of the present invention, a cache policy control entity may further update overdue service data in a primary cache and an edge cache according to update duration of a resource.

In the foregoing embodiments, if the cache policy control entity is located in a same function entity with the primary cache, what is different from the service data cache processing method in the foregoing embodiments is that information exchange between the cache policy control entity and the primary cache is implemented internally, other parts are the same and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A service data cache processing method, comprising:
    receiving, with respect to service data to be provided to a user equipment (UE), through a core network and through a radio access network, statistical information of the service data, wherein the core network is different from the radio access network, and the radio access network is a local wireless communication network where the UE is located, wherein the UE communicates with the core network through the radio access network, and wherein the service data is provided by a service provider (SP) device from a location that is outside the radio access network;
    making a determination, according to the statistical information, as to when to perform a tiered caching of the service data, and when to perform a direct caching of the service data in the radio access network, wherein the tiered caching is performed by first caching the service data in the core network with a primary cache deployed in the core network, before the service data is moved into and cached in the radio access network, and wherein the direct caching in the radio access network is performed by directly caching the service data from the SP device in the radio access network with an edge cache deployed in the radio access network, without first caching the service data in the core network; and
    sending a service data push request to the SP device, so that the SP device sends the service data corresponding to the service data push request to the primary cache deployed in the core network, when it is determined to perform the tiered caching of the service data, and to the edge cache deployed in the radio access network, when it is determined to directly cache the service data in the radio access network;
    wherein each of the SP device, the primary cache, the edge cache, and the UE are different and separate from one another; and
    wherein the statistical information of the service data comprises any one or a combination of the following:
        the statistical information of the service data whose access traffic is greater than a first preset value;
        the statistical information of the service data whose attention degree is greater than a second preset value; and
        the statistical information of the service data that comprises a preset keyword.

2. The service data cache processing method according to claim 1, wherein making the determination comprises determining a data cache policy according to the statistical information; and
    wherein sending the service data push request comprises sending the service data push request to the SP device according to the data cache policy.

3. The service data cache processing method according to claim 1, wherein receiving the statistical information of the service data comprises:
    receiving the statistical information that is acquired by statistics by the SP device according to a service data request sent by the UE; or
    receiving the statistical information that is acquired by statistics by the primary cache according to a service data request sent by the UE; or
    receiving the statistical information that is acquired by statistics by the edge cache according to a service data request sent by the UE; or receiving the statistical information that is acquired by statistics by the SP device according to a service data request collected from various service platforms.

4. The service data cache processing method according to claim 3, wherein making the determination comprises determining, according to the statistical information, a first data cache policy corresponding to the primary cache and a second data cache policy corresponding to the edge cache; and wherein sending the service data push request to the SP device comprises:
sending a first service data download request to the SP device according to the first data cache policy, so that the SP device sends the service data to the primary cache according to the first service data download request; and
sending a second service data download request to the SP device according to the second data cache policy, so that the SP device sends the service data to the edge cache according to the second service data download request.

5. The service data cache processing method according to claim 4, wherein, after sending the first service data download request to the SP device according to the first data cache policy, the method further comprises:
determining, according to the statistical information, a third data cache policy corresponding to the edge cache; and
sending a third service data download request to the primary cache according to the third data cache policy, so that the primary cache sends the service data, which is cached in the core network, to the edge cache in the radio access network, according to the third service data download request.

6. A cache policy control entity, comprising:
processor; and
a non-transitory computer-readable storage medium storing a program to be executed by the processor, the program includes instructions to instruct the processor to:
receive, with respect to service data to be provided to a user equipment (UE), through a core network and through a radio access network, statistical information of the service data, wherein the core network is different from the radio access network, and the radio access network is a local wireless communication network where the UE is located, wherein the UE communicates with the core network through the radio access network, and wherein the service data is provided by a service provider (SP) device from a location that is outside the radio access network;
make a determination, according to the statistical information, as to when to perform a tiered caching of the service data, and when to perform a direct caching of the service data in the radio access network, wherein the tiered caching is performed by first caching the service data in the core network with a primary cache deployed in the core network, before the service data is moved into and cached in the radio access network, and wherein the direct caching in the radio access network is performed by directly caching the service data in the radio access network with an edge cache deployed in the radio access network, without first caching the service data in the core network; and
send a service data push request to the SP device, for the SP device to send the service data corresponding to the service data push request to the primary cache deployed in the core network, when it is determined to perform the tiered caching of the service data, and to the edge cache deployed in the radio access network, when it is determined to directly cache the service data in the radio access network;
wherein each of the SP device, the primary cache, the edge cache, and the UE are different and separate from one another; and
wherein the statistical information comprises any one or a combination of the following:
information of the service data whose access traffic is greater than a first preset value;
information of the service data whose attention degree is greater than a second preset value; and
information of the service data that comprises a preset keyword.

7. The cache policy control entity according to claim 6, wherein the instructions to instruct the processor to make the determination comprise instructions to instruct the processor to determine a data cache policy according to the statistical information; and wherein the instructions to instruct the processor to send the service data push request comprises instructions to instruct the processor to send the service data push request to the SP device according to the data cache policy.

8. The cache policy control entity according to claim 6, wherein the program includes instructions to instruct the processor to:
receive the statistical information that is acquired by statistics by the SP device according to a service data request sent by the UE; or
receive the statistical information that is acquired by statistics by the primary cache according to a service data request sent by the UE; or
receive the statistical information that is acquired by statistics by the edge cache according to a service data request sent by the UE; or
receive the statistical information that is acquired by statistics by the SP device according to a service data request collected from various service platforms.

9. The cache policy control entity according to claim 8, wherein the instructions to instruct the processor to make the determination comprise instructions to instruct the processor to determine a first data cache policy corresponding to the primary cache and a second data cache policy corresponding to the edge cache; and wherein the instructions to instruct the processor to send the service data push request comprise instructions to instruct the processor to:
send a first service data download request to the SP device according to the first data cache policy, so that the SP device can send the service data to the primary cache according to the first service data download request; and
send a second service data download request to the SP device according to the second data cache policy, so that the SP device can send the service data to the edge cache according to the second service data download request.

10. The cache policy control entity according to claim 9, wherein the program includes instructions to instruct the processor to:
determine, according to the statistical information, a third data cache policy corresponding to the edge cache; and
send a third service data download request to the primary cache according to the third data cache policy, so that the primary cache can send the service data, which is cached in the core network, to the edge cache in the radio access network, according to the third service data download request.

11. The cache policy control entity according to claim 6, wherein the program includes further instructions to instruct the processor to receive an update message that is of the statistical information and sent by the SP device, and to send a data update request message to the SP device according to the update message, so that the SP device can send, according to the data update request message, the service data corresponding to the service data push request to the primary cache or the edge cache.

12. A network device, comprising:
a processor; and
a non-transitory computer-readable storage medium storing a program to be executed by the processor, the program includes instructions to instruct the processor to:
acquire, with respect to service data to be provided to a user equipment (UE), through a core network, and through a radio access network, statistical information related to the service data, wherein the core network is different from the radio access network and the radio access network is a local wireless communication network where the UE is located, wherein the UE communicates with the core network through the radio access network, and wherein the service data is provided by a service provider (SP) device from a location that is outside the radio access network;
make a determination, according to the statistical information, as to when to perform a tiered caching of the service data, and when to perform a direct caching of the service data in the radio access network, wherein the tiered caching is performed by first caching the service data in the core network with a primary cache deployed in the core network, before the service data is moved into and cached in the radio access network, and wherein the direct caching in the radio access network is performed by directly caching the service data from the SP device in the radio access network with an edge cache deployed in the radio access network, without first caching the service data in the core network; and
send the statistical information to a cache policy control entity, so that the cache policy control entity can request the SP device to send the service data corresponding to a service data request to the primary cache deployed in the core network, when it is determined to perform the tiered caching of the service data, and to the edge cache deployed in the radio access network, when it is determined to directly cache the service data in the radio access network;
wherein each of the SP device, the primary cache, the edge cache, and the UE are different and separate from one another; and
wherein the statistical information comprises any one or a combination of the following:
information of the service data whose access traffic is greater than a first preset value;
information of the service data whose attention degree is greater than a second preset value; and
information of the service data that comprises a preset keyword.

13. The network device according to claim 12, wherein the program includes instructions to instruct the processor to perform statistical processing on a service data request sent by the UE to acquire the statistical information.

14. The network device according to claim 12, wherein the cache policy control entity is different and separate from the network device;
wherein the network device is one of the SP device, the primary cache, and the edge cache; and
wherein the cache policy control entity is disposed in either: another one of the SP device, the primary cache, and the edge cache, or a standalone device that is different and separate from the SP device, the primary cache and the edge cache.

15. The network device according to claim 12, wherein the program includes instructions to instruct the processor to perform statistical processing on the service data request collected by various service platforms to acquire the statistical information.

16. The network device according to claim 12, wherein the program includes further instructions to instruct the processor to send an update message of the statistical information to the cache policy control entity, to receive a data update request message that is sent by the cache policy control entity according to the update message, and to send, according to the data update request message, the service data corresponding to the service data request to the primary cache or the edge cache.

17. The network device according to claim 16, wherein the network device is the SP device.

* * * * *